United States Patent Office
3,629,210
Patented Dec. 21, 1971

3,629,210
THIOPEROXYDIPHOSPHATES AND COPPER SALTS AS VULCANIZATION ACCELERATORS
David Apotheker and Sylvain M. Hirsty, Wilmington, Del., assignors to E. I. du Pont de Nemours and Company, Wilmington, Del.
No Drawing. Filed Apr. 11, 1969, Ser. No. 815,489
Int. Cl. C08f 27/06; C08c 11/34, 11/66
U.S. Cl. 260—79.5     6 Claims

ABSTRACT OF THE DISCLOSURE

A new class of vulcanization promoters for vulcanizing sulfur-curable hydrocarbon backbone elastomers in the presence of sulfur and a thioperoxydiphosphate accelerator. The promoters are cupric salts of organic acids and especially of the thioacids: 2-mercaptobenzothiazole, O,O-diesters of phosphorodithioic acid, O-esters of arylphosphonodithioic acids, aryldithiocarboxylic acids, and certain carboxylic acids. A new vulcanization process using organic cupric salts as promoters.

BACKGROUND OF THE INVENTION

This invention relates to a new vulcanization system for sulfur-curable hydrocarbon backbone elastomers. In particular, it relates to a new class of vulcanization promoters which are used in conjunction with certain thioperoxydiphosphate vulcanization accelerators.

Both natural and synthetic rubbers can be vulcanized by heating the rubber with sulfur, a tetraalkyl thioperoxydiphosphate, and a conventional rubber accelerator, such as tetramethylthiuram disulfide, 2-mercaptobenzothiazole, benzothiazyl disulfide, and the like, as taught by the British Pat. 894,098 to Imperial Chemical Industries.

While certain conventional rubber vulcanization accelerators are quite satisfactory for such applications, many accelerators are not sufficiently active to give an acceptable cure rate. Others cannot be used for special applications, such as vulcanization of automobile tires built with polyester cords because they weaken the polyester tire cords, a phenomenon known as "tendering" of the fibers. There is, therefore, a need for a vulcanization system which is sufficiently active to provide an acceptable curing rate and which preferably does not "tender" the cords.

SUMMARY OF THE INVENTION

It has been discovered that sulfur-curable elastomers which have hydrocarbon backbones can be readily vulcanized by heating in the presence of (A) sulfur; (B) zinc oxide; (C) a thioperoxydiphosphate vulcanization accelerator of the following formula:

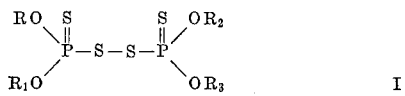

wherein R, $R_1$, $R_2$, and $R_3$ are individually alkyl, alkenyl, cycloalkyl, cycloalkenyl, or aralkyl radicals containing 3–20 carbon atoms; and (D) a cupric salt of an organic acid as a promoter.

Any organic cupric salt can be used as the ingredient (D) in the above formulation. However, it has been found that cupric salts which do not release amines either on heating or on aging are especially useful as (D) for curing elastomer compositions employed in the manufacture of polyester cord tires and other articles containing polyester fibers.

Particularly preferred cupric salts useful as promoters are salts of the following organic acids:

(1) 2-mercaptobenzothiazole, (2) O,O-diesters of phosphorodithioic acid, as shown by Formula II:

wherein $R_4$ and $R_5$ are independently alkyl, aryl, cycloalkyl, cycloalkenyl, or aralkyl radicals containing 3–20 carbon atoms.

(3) O-esters of arylphosphonodithioic acids, having the structure:

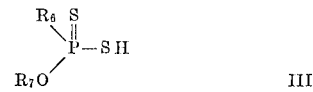

wherein $R_6$ is an aryl and $R_7$ is an alkyl having 3–20 carbon atoms;

(4) aryldithiocarboxylic acids having the structure:

wherein $R_8$ is an aryl; and (5) carboxylic acids having the structure:

where $R_9$ is hydrogen, or an alkyl, alkenyl or cycloalkyl having 1–20 carbon atoms or an aryl.

In the elastomer vulcanization process of the present invention, the thioperoxydiphosphates (C) together with the cupric salts (D) facilitate the vulcanization process by reducing either the time or the temperature below that normally required. Although it is well known that copper salts generally accelerate the decomposition of natural rubber, the above formulations do not cause deterioration of natural rubber, either alone or in mixtures with synthetic rubbers.

NOMENCLATURE

Because of the lack of a generally accepted nomenclature for organic phosphorus compounds, Chemical Abstracts nomenclature is used herein. Thus, the vulcanization accelerators of Formula I where R, $R_1$, $R_2$, and $R_3$ are alkyl are called tetraalkyl thioperoxydiphosphates. Similarly, cupric salts of acids illustrated by the Formula II where $R_4$ and $R_5$ are alkyl are called cupric O,O-dialkyl phosphorodithioates; and cupric salts of the acids of Formula III are called O-alkyl arylphosphonodithioates.

DETAILED DESCRIPTION

In the process of vulcanization of sulfur-curable hydrocarbon elastomers in the presence of sulfur, the vulcanization accelerator (C) is used in the amount of 0.2–5.0 parts per 100 parts of the elastomer; the preferred amount is 0.5–3 parts. The promoter (D) is used in the amount of 0.02–3.0 parts per 100 parts of the elastomer, the preferred range being 0.25–1.5 parts.

Generally, when accelerator and promoter concentrations fall below the lower limits of their useful ranges indicated above, vulcanization rates become so low that good elastomers cannot be obtained within the times and at temperatures normally employed. As the concentration of the accelerators and promoters increases, the vulcanization rate also increases and reaches a plateau at the upper limits of the concentration ranges. Increasing the accelerator and/or promoter concentration beyond these limits is impractical because no improvement in either cure rates or elastomer properties is obtained.

The tetrasubstituted thioperoxydiphosphates used as vulcanization accelerators can be readily prepared by known methods, e.g., by oxidation of O,O-disubstituted phosphorodithioic acids, as disclosed in U.S. Pats. 2,523,146 and 2,523,147 or in German Pat. 859,458. Either a single O,O-disubstituted phosphorodithioic acid or a mixture of two differently substituted phosphorodithioic acids, can be used. The most effective vulcanization accelerators of this type are those in which each hydrocarbon radical contains three to five carbon atoms. Particularly suitable thioperoxydiphosphates are those in which R, $R_1$, $R_2$, and $R_3$ are selected from the group: propyl, isopropyl, butyl, sec-butyl, and 2,2-dimethylpropyl. Other possible hydrocarbon radicals include: 2-methylpentyl, hexyl, heptyl, 2-ethylhexyl, octyl, cyclopentyl, cyclohexyl, undecyl, dodecyl, hexadecyl, octadecyl, octadecenyl, benzyl, phenethyl, and methylbenzyl.

Any cupric salt of an organic acid which can be intimately dispersed in a vulcanizable hydrocarbon backbone elastomer formulation can be used in the process of this invention. For instance, cupric dimethyldithiocarbamate:

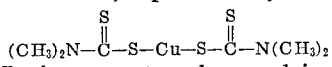

is a very effective promoter when used in combination with a thioperoxydiphosphate vulcanization accelerator described above.

Cupric dimethyldithiocarbamate, which yields dimethylamine, is, however, unsuitable for applications in which a fibrous polyester material is in contact with an elastomer formulation during vulcanization.

Preferred promotors which do not adversely affect polyesters are cupric 2-mercaptobenzothiazolate, certain cupric O,O-disubstituted phosphorodithioates (II), arylphosphonodithioates (III), aryldithiocarboxylates (IV), and salts of carboxylic acids (V).

Typical cupric O,O-disubstituted phosphorodithioates (II), can have aliphatic substituents, such as propyl, butyl, isobutyl, and tert-butyl, pentyl, hexyl, octyl, nonyl, undecyl, hexadecyl, octadecyl, and eicosyl; cycloaliphatic substituents, such as cyclopentyl, cyclohexyl, and cyclooctyl; olefinic substituents, e.g., undecenyl and octadecenyl; aralkyl substituents, e.g., benzyl, ar-methylbenzyl; and phenethyl; and aryl and alkaryl substituents, such as phenyl, naphthyl, anthryl, tolyl, xylyl, and tetramethylphenyl.

Cupric alkyl arylphosphonodithioates (III) can have the same alkyl and aryl groups as the phosphorodithioates (II).

Representative aryl groups of the aryldithiocarboxylic acids (IV) and of aromatic carboxylic acids (V) can be the same as in the arylphosphonodithioates (II), above, while aliphatic carboxylic acids (V), include those in which the $R_9$ group is hydrogen, methyl, ethyl, propyl, butyl, heptyl, nonyl, undecyl, heptadecyl, eicosyl, undecenyl, heptadecenyl, cyclohexyl, cycloheptyl, and cyclooctyl. Generally the substituent groups in Formulas I, II, III, IV, and V contain no more than about 20 carbon atoms.

Any sulfur-curable elastomers which have a hydrocarbon backbone, but which may have certain nonhydrocarbon substituents such as the cyano group, can be vulcanized according to the process of this invention. These elastomers include natural rubber as well as homopolymers and copolymers of conjugated dienes and copolymers of alpha-olefins with a nonconjugated diene. Some of the known elastomers which can be vulcanized by this process are copolymers of butadiene styrene (SBR), butadiene acrylonitrile (NBR), butadiene or isoprene with isobutylene (butyl rubber), and terpolymers of ethylene, propylene and a nonconjugated diene having only one reactive double bond (EPDM).

EPDM elastomers which can be vulcanized by the process of this invention include the following terpolymers:

ethylene/propylene/ethylidenenorbornene,
ethylene/propylene/methylenenorbornene,
ethylene/propylene/dicyclopentadiene, and
ethylene/propylene/1,4-hexadiene.

Mixtures of two or more unsaturated hydrocarbon elastomers can also be vulcanized.

In operating this invention, sulfur, zinc oxide, a vulcanization accelerator and a promoter, together with other conventional rubber-compounding ingredients, are incorporated into a hydrocarbon elastomer in the usual manner of compounding rubber as for example on a rubber mill or in a Banbury mixer. Sulfur, which is used as the vulcanizing agent, is present in the amount of 0.2–3 parts per 100 parts of the elastomer. Zinc oxide is present in the amount of 2–10 parts per 100 parts of the elastomer, 3–5 parts being most practical. Zinc oxide is believed to act as a vulcanization catalyst by regenerating the accelerator from its complex with sulfur. Other ingredients can include antioxidants, processing aids or extenders (such as oils and plasticizers), pigments and fillers (for instance, carbon black, clay and titanium dioxide). A small amount of other vulcanization accelerators, such as 2-mercaptobenzothiazole or 2-benzothiazolyl disulfide can optionally be added to the mixture.

An elastomer compound is vulcanized according to this invention by heating in conventional vulcanization equipment such as a press, a mold, an oven, or a vulcanization chamber of an extrusion apparatus. A temperature of about 120–160° C. is maintained for a period of five minutes to one hour. These temperatures and time ranges, of course, are not critical; and lower or higher temperatures and longer or shorter vulcanization times can be used, depending on the particular elastomer formulation and the contemplated application of the vulcanized material. The art is well aware of these factors and how to use them.

The following examples illustrate the invention. All parts, percentages and proportions are by weight unless otherwise indicated.

EXAMPLE 1

The following formulation is compounded on a two-roll rubber mill:

TABLE I

|  | Parts |
|---|---|
| Natural rubber (Smoked Sheet No. 1) | 50 |
| Butadiene-styrene copolymer containing 23.5% bound styrene and having a Mooney viscosity (ML 1+4 at 212° F.) of about 52 (SBR–1500) | 50 |
| High abrasion furnace black | 35 |
| Stearic acid | 1 |
| Naphthenic oil ("Circosol" 2XH, Sun Oil Co.) | 10 |
| Diphenylamine-acetone condensation product (antioxidant) | 1 |
| Zinc oxide | 3 |
| Sulfur | 2.5 |
| Accelerator/promoter composition (as shown in Table II) | 2 |

The following three accelerator/promoter compositions are compared:

TABLE II

|  | Parts |
|---|---|
| Accelerator A: |  |
| (1) Tetrapropyl thioperoxydiphosphate | 1.5 |
| (2) Cupric O,O - diisopropyl phosphorodithioate | 0.5 |
| Accelerator B: |  |
| (1) Same as in A (1) | 1.5 |
| (2) 2-benzothiazolyl disulfide | 0.5 |
| Accelerator C: |  |
| (1) Same as in A (1) | 1.5 |
| (2) Ferric O,O - diisopropyl phosphorodithioate | 0.5 |

The curing rates of the stocks at 153° C. are examined by means of the Monsanto Oscillating Disc Rheometer (ODR), which measures the relative viscosity of an elastomer by oscillating a grooved biconical disc through an arc while pressed tightly between two test pieces. The amount of torque required to oscillate the disc is reported as the measure of viscosity. Onset of curing is indicated by a rise in viscosity. Curing curves are obtained in which the viscosities (torque in inch-pounds) are plotted against time in minutes. A measure of rate of cure is given by measuring the slope of the curve at its steepest point. The slopes of the curing curves are given in Table III, below.

TABLE III

Accelerator composition

Slope of curing curve, lb.-in./min.:
A ------------------------------------------- 25
B ------------------------------------------- 11
C ------------------------------------------- 6

These results show that a much faster cure is obtained with cupric O,O-diisopropyl phosphorodithioate as the promoter than with either ferric O,O-diisopropyl phosphorodithioate or 2-benzothiazolyl disulfide.

EXAMPLE 2

Vulcanization is carried out in the same way and with the same compound formulation as in Example 1 except that the accelerator is tetraisopropyl thioperoxydiphosphate. Five different promoters are compared. In each test, 1.5 parts of the accelerator and 0.5 part of a promoter are used. The promoters and the slopes of the curving curves at their steepest points are tabulated below:

TABLE IV

| Promoter: | Slope of curing curve lb.-in./min. |
|---|---|
| Cupric 2-mercaptobenzothiazolate | 35 |
| Cupric O,O-diisopropyl phosphorodithioate | 30 |
| Ferric 2-mercaptobenzothiazolate | 9 |
| Ferric O,O-diisopropyl phosphorodithioate | 8 |
| 2-benzothiazolyl disulfide | 12 |

It can be seen that cupric salts give much faster cures than either the corresponding ferric salts or 2-benzothiazolyl disulfide.

EXAMPLE 3

Vulcanization is carried out in the same way and with the same compound formulation as in Example 1. The accelerator system consists of 1.5 parts of tetraisopropyl thioperoxydiphosphate and 0.5 part of a promoter. Selected metal dimethyldithiocarbamates and salts of fatty acids are evaluated here as promoters. These compounds and the slopes of the curing curves at their steepest points are presented in Table V:

TABLE V (a)

| Dimethyldithiocarbamates: | Slope of curing curve-lb.-in./min. |
|---|---|
| Cupric | 60 |
| Ferric | 28 |
| Bismuth | 30.8 |
| Zinc | 23.2 |

(b)

Salts of fatty acids:
| | |
|---|---|
| Cupric stearate | 13.6 |
| Ferric octoate | 5.8 |
| Stannous octoate | 6.6 |

Although dimethyldithiocarbamic acid derivatives themselves, have some promoter effect, the above data shows that the copper salt is much more effective than the ferric, bismuth, or zinc salts. Similarly, it can be seen that cupric stearate is a better promoter in this system than either ferric or stannous octoates.

EXAMPLE 4

The EPDM rubber used in this example is a copolymer of ethylene, propylene, and 1,4-hexadiene made by copolymerizing the monomers in tetrachloroethylene in the presence of a coordination catalyst prepared by mixing vanadium oxytrichloride and diisobutylaluminum monochloride in accordance with the general procedure of U.S. Pat. 2,933,480. The copolymer has a Mooney Viscosity (ML 1+4 at 250° F.) of about 70. The typical monomer unit composition is 52.5 weight percent ethylene, 44 weight percent propylene, and 3.5 weight percent 1,4-hexadiene. The degree of unsaturation is about 0.3 mole of ethylenic unsaturation per kilogram.

Compounded stocks are prepared by milling the ingredients into the elastomer using the following formulation:

TABLE VI

| | Parts |
|---|---|
| Elastomer, EPDM rubber | 100 |
| Zinc oxide | 5 |
| Sulfur | 2 |
| Fast extrusion furnace black | 100 |
| Medium thermal black | 60 |
| Naphthenic oil ("Circosol" 42XH, Sun Oil Co.) | 60 |
| 2-mercaptobenzothiazole | 1.5 |
| Accelerator/promotor composition | (1) |

¹ As shown in Table VII.

The compounded stock is heated in a Monsanto Oscillating Disc Rheometer at 160° C. for 30 minutes. The rate of cure is measured by calculating the slope of the curing curve at its steepest points. The results are shown in Table VII, below:

TABLE VII

| | Parts | | |
|---|---|---|---|
| Tetraisopropyl thioperoxydiphosphate | 2 | *0 | 3 |
| Cupric O,O-diisopropyl phosphorodithioate | 1.5 | 3 | 0 |
| Slope of curing curve, lb.-in./min | 19.6 | 7.0 | 12.6 |

* Only 1 part of mercaptobenzothiazole is used.

The above data shows that when both the vulcanization accelerator and the promoter are present, the cure rate is considerably higher than when either one of these ingredients is missing.

We claim:

1. A composition comprising: (A) a sulfur-curable hydrocarbon elastomer, (B) zinc oxide, (C) sulfur, and (D) a vulcanization accelerator consisting essentially of:
   (1) a thioperoxydiphosphate of the formula $$\begin{array}{c}RO\\ \diagdown\\ R_1O\end{array}\!\!\overset{S}{\underset{}{\overset{\|}{P}}}\!\!-\!S\!-\!S\!-\!\overset{S}{\underset{}{\overset{\|}{P}}}\!\!\begin{array}{c}\diagup OR_2\\ \\ \diagdown OR_3\end{array}$$

wherein R, $R_1$, $R_2$, and $R_3$ each is independently selected from the group: alkyl, cycloalkyl, alkenyl, cycloalkenyl, and aralkyl radicals containing 3–20 carbon atoms, and
   (2) a cupric salt of an organic acid selected from the group:
      (i) an organic thioacid selected from the group consisting of:
         (a) a phosphorodithioic acid of the formula $$\begin{array}{c}R_4O\\ \diagdown\\ R_5O\end{array}\!\!\overset{S}{\underset{}{\overset{\|}{P}}}\!-\!SH$$

wherein $R_4$ and $R_5$ each is independently selected from the group: aryl, alkyl, cycloalkyl, alkenyl, cycloalkenyl, and aralkyl radicals containing 1–20 carbon atoms; and
         (b) mercaptobenzothiazole; and
      (ii) a carboxylic acid of the formula $$R_9\!-\!\overset{\overset{O}{\|}}{C}\!-\!OH$$

where $R_9$ is selected from the group: hydrogen, alkyl, alkenyl and cycloalkyl having 1–20 carbon atoms and aryl.

2. A composition of claim 1, wherein component (B) is present in the proportion of about 2–10 parts; component (C) is present in the proportion of about 0.2–3.0 parts; the component (D) (1) is present in the proportion of about 0.2–5.0 parts, and the component (D) (2) is present in the proportion of about 0.02–3.0 parts, all amounts based on 100 parts of sulfur-curable hydrocarbon elastomer.

3. In a process for vulcanizing a sulfur-curable hydrocarbon elastomer, which comprises contacting said elastomer with sulfur in the presence of zinc oxide and of a vulcanization accelerator of the formula

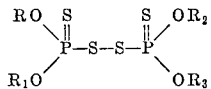

wherein each of R, $R_1$, $R_2$, and $R_3$ contains 3–20 carbon atoms and is independently selected from the group: alkyl, cycloalkyl, alkenyl, cycloalkenyl, and aralkyl radicals, the improvement which consists essentially of employing as a vulcanization promoter a cupric salt of an organic acid selected from the group:

(i) an organic thioacid selected from the group consisting of:
(a) a phosphorodithioic acid of the formula

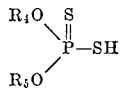

wherein $R_4$ and $R_5$ each is independently selected from the group: aryl, alkyl, cycloalkyl, alkenyl, cycloalkenyl, and aralkyl radicals containing 1–20 carbon atoms; and
(b) mercaptobenzothiazole; and (ii) a carboxylic acid of the formula

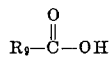

where $R_9$ is selected from the group: hydrogen, alkyl, alkenyl and cycloalkyl having 1–20 carbon atoms and aryl.

4. In a process for vulcanizing a sulfur-curable hydrocarbon elastomer, which comprises contacting said elastomer with sulfur in the presence of zinc oxide and of a vulcanization accelerator of the formula

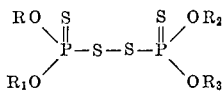

wherein each of R, $R_1$, $R_2$, and $R_3$ contains 3–20 carbon atoms and is independently selected from the group: alkyl, cycloalkyl, alkenyl, cycloalkenyl, and aralkyl radicals, the improvement which consists essentially of employing as a vulcanization promoter a cupric salt of claim 2.

5. Process of claim 4 wherein the vulcanization accelerator is selected from the group: tetrapropyl thioperoxydiphosphate, tetraisopropyl thioperoxydiphosphate, and tetraneopentyl thioperoxydiphosphate; and the promoter is selected from the group: cupric 2-mercaptobenzothiazolate and cupric diisopropyl phosphorodithioate.

6. Process of claim 3, wherein sulfur is present in the proportion of 0.2–3.0 parts; zinc oxide is present in the proportion of 2–10 parts; the vulcanization accelerator is present in the proportion of 0.2–5.0 parts, and the promoter is present in the proportion of 0.02–3.0 parts, all based on 100 parts by weight of the sulfur-curable hydrocarbon elastomer.

References Cited
UNITED STATES PATENTS 2,926,718  3/1960  Baldwin _____ 152—330
3,419,521  12/1968  Scott _____ 260—41.5

JOSEPH L. SCHOFER, Primary Examiner

C. A. HENDERSON, Jr., Assistant Examiner

U.S. Cl. X.R.

260—5, 23.7, 41.5, 783, 785, 793, 802, 894